Oct. 11, 1966 D. E. KRAFT 3,277,576
RESTORATIVE DENTAL DEVICE
Filed June 6, 1963
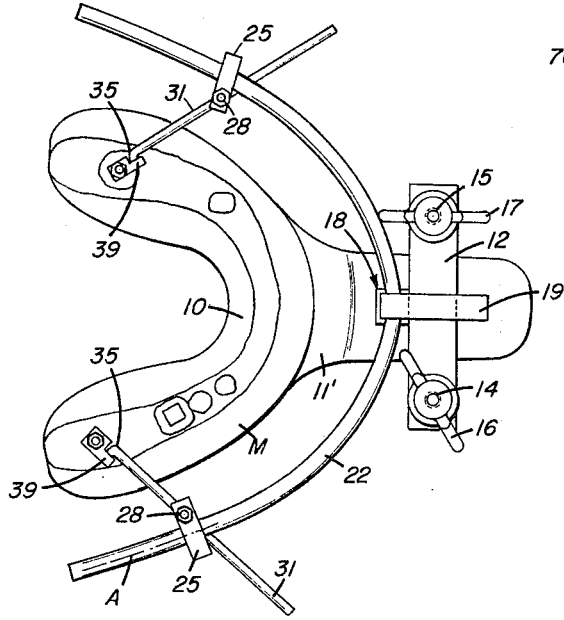
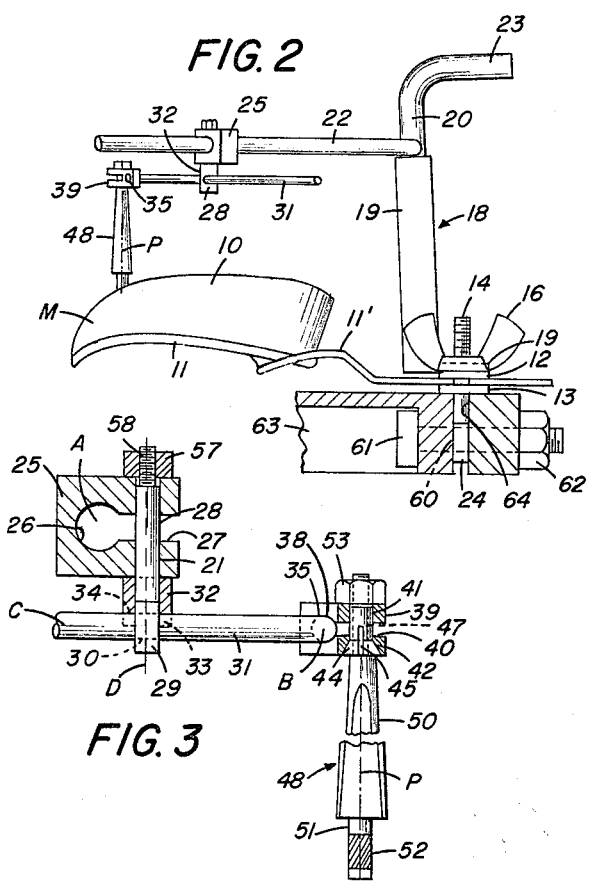
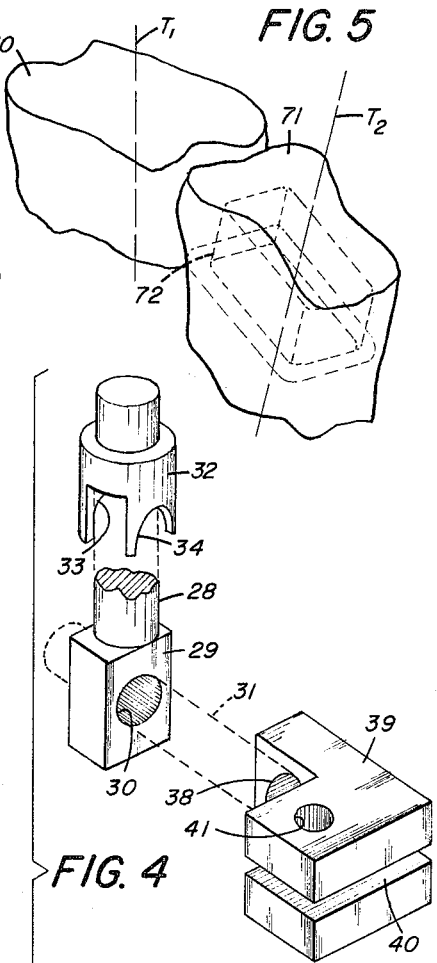
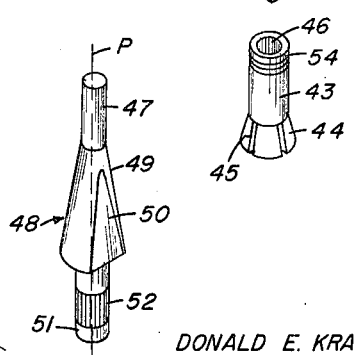
DONALD E. KRAFT
INVENTOR.
BY *Lloyd F. Seebach*
AGENT

# United States Patent Office 3,277,576
Patented Oct. 11, 1966

3,277,576
RESTORATIVE DENTAL DEVICE
Donald E. Kraft, 58 Montclair Drive, Rochester, N.Y.
Filed June 6, 1963, Ser. No. 285,951
14 Claims. (Cl. 32—40)

The present invention relates to a restorative dental device, and more particularly to a device specifically adapted for orienting the axis of one or more of the handling pins with respect to the axis of a tooth or teeth in accordance with the impression of the tooth or teeth and for holding the pin in such position while the material that is used to make the model of the tooth or teeth hardens.

For the making of a cap or bridge, the tooth or teeth are usually prepared and reduced in size to the form which it is to have for receiving the cap or bridge. With respect to a cap in particular, the tooth is reduced in size and an impression is then taken of the tooth by means of an impression material and a cast made of the tooth impression for forming the equivalent of the tooth. This is accomplished by positioning the impression so that a pin can be placed within the tooth impression to provide a means for holding the stone model of the tooth while the "wax-up" of the cap is being made or formed. In the prior art, such a pin is usually placed in the impression in substantially a perpendicular relationship to the plane on which the impression rests. When positioned in this relationship, the pin is not necessarily oriented with respect to the axis of the tooth impression, and does not provide a direct tooth relationship when the stone model is cut and separated to facilitate the "wax-up" of the tooth cap from which the cap is finally cast.

In the present invention, the pin is supported over the impression in such a manner that the axis of a pin can be oriented with the axis of a tooth impression. This is accomplished by mounting the pin in such a manner that it can be axially adjusted in three different planes and, in addition, moved relative to the tooth impression in order to obtain an exact orientation with respect to the true axis of the tooth impression. When the pin has been so oriented, the impression is filled with stone to provide a model of the tooth impression which extends beyond the gum line of the impression. After the stone has hardened, the pin is released from the support member and the support member is removed. A plastic sleeve is then placed on the end of the pin. A separating material is painted on the hardened stone and additional stone is then poured to provide a base for the tooth model. After this additional stone has hardened, the first layer of stone is cut on each side of the tooth model, thereby permitting the tooth model and pin to be removed so that a "wax-up" of the cap can be shaped about the tooth model. The tooth model can be returned to the stone base at any time and the pin accurately locates and orients the tooth model with respect to the stone mold of the mouth in order to ascertain the proper shape and size of the cap relative to the adjoining teeth. Once the "wax-up" has been completed, the cap is then cast in a manner well known to those skilled in the art.

The device described hereinafter comprises a holder for receiving the tooth impression and means for securing the impression to the holder. A support post carries a member which has a shape similar to and larger than that of a jaw contour and carries means for receiving and securing one end of a pin in spaced relation to the support member and providing for six adjustments of the pin in three planes and for locking the pin in the adjusted position by means of two clamping elements. Since the support member is similar in shape to that of the jaw impression, the pins can be placed in any position along the support member so as to be positioned relative to the proper tooth impression. While the invention described hereinafter is confined to the description of only one pin, it is to be understood that a number of such pins can be carried by the support member so as to be individually adjusted with respect to different tooth impressions.

The primary object of the invention, therefore, is to provide a restorative dental device by which the pin positioned with respect to a tooth impression can be accurately aligned with the axis of such impression.

Another object of the invention is to provide a restorative dental device in which the pin oriented with respect to the axis of a tooth impression is securely locked in an adjusted position relative to the axis of the tooth impression.

Another object of the invention is to provide a restorative dental device in which the pin oriented with respect to the tooth impression can be adjusted in a number of directions so as to orient the axis of the pin with the axis of the tooth impression.

Still another object of the invention is to provide a restorative dental device in which a number of pins can be independently oriented with respect to separate tooth impressions and individually locked in their adjusted positions.

These and other objects and advantages of the invention will be apparent to those skilled in the art by the description which follows. Reference is now made to the accompanying drawings wherein like reference numerals and letters designate like parts and wherein:

FIG. 1 is a plan view of the device and showing the position of the impression relative to the support member for the individual pins;

FIG. 2 is a side elevation of the device which shows the manner in which the holder for the impression and the support member for the pins are mounted on a base;

FIG. 3 is a vertical section through the means for supporting a pin for adjustably positioning the pin in relation to a tooth impression;

FIG. 4 is an exploded perspective view showing the means for clamping the pin in relation to the support member and for clamping the pin in its respective collet; and FIG. 5 is a diagrammatic representation of two teeth showing how their axes may vary and showing in dotted lines how a portion of one tooth may be cut down for receiving the cap to be applied thereto.

With reference particularly to FIGS. 1 and 2, an impression 10 is made of the patient's mouth after the tooth has been properly prepared for receiving a cap. The impression material M is usually carried by a tray or holder 11 provided with a handle portion 11'. After the impression 10 has been made, the holder 11 is positioned between plates 12 and 13 and clamped thereto by a pair of spaced studs 14 and 15 and a pair of wing nuts 16 and 17. The plate 12 carries a support post 18 comprising a hollow, square vertical portion 19 that is secured to plate 12 and a movable square portion 20 which is slidably mounted within portion 19 by means of fingerpiece 23, the lower end of portion 20 bottoming on plate 12 to locate it in a vertical direction. As shown in FIG. 1, a support member 22 is secured to the movable portion 20 and has a shape in a horizontal plane which is similar to and larger than that of a jaw contour as outlined by the impression 10. Since the fixed and movable portions 19 and 20 are square, portion 20 cannot be rotated relative to portion 19 and has only a vertical path of insertion into and withdrawal from portion 19 by means of fingerpiece 23. Accordingly, support member 22 and its appurtenances can always be positioned in the same relationship to the impression 10. Plate 13 is provided with an extension 24 having an aperture 60 for receiving a stud 61 which, by a nut 62, secures the holder 11, support post 18 and support member 22 as a unit to a base 63 which is provided with an aperture 64 for receiving extension 24.

The support member 22 carries a block 25 which is provided with an aperture 26 for receiving the support member 22 and with a horizontal slot 27 which intersects the aperture 26, as shown in FIG. 3. The block 25 is also provided with a vertical aperture 21 for a stud 28 which, on its lower end, is formed with a rectangular extension 29 having an aperture 30 for receiving an L-shaped rod 31. Between the extension 29 and the rod 31, a sleeve 32 is arranged on the stud 28 and is provided with a rectangular notch 33 which provides clearance for the extension 29 and an arcuate notch 34 for engaging the rod 31, as clearly shown in FIG. 4.

The rod 31 is provided with an extension 35 which is formed at right angles to the principal axis of said rod. The extension 35 engages an aperture 38 in a block 39, as shown in FIG. 3. The block 39 is L-shaped and is provided with a horizontal slot 40 which intersects aperture 38 and a vertical aperture 41 which intersects slot 40, as shown in FIG. 4. The end of aperture 41 adjacent the bottom side of the block 39 is countersunk as designated by the numeral 42. The aperture 41 is adapted to receive a collet 43 having a flared head 44 which is provided with radial slots 45 and a central aperture 46 for receiving the end 47 of pin 48. The pin 48 comprises, in addition to the end 47, a central tapered portion 49 which is provided with a flat 50 and an extenson 51 having a knurled section 52. The end 47 is placed in the aperture 46 of collet 43 and a nut 53, which engages the threaded end 54 of the collet, draws the collect against the countersink 42 to tightly clamp the end 47 of pin 48 and extension 35 of rod 31 to the block 39, as shown in FIG. 3.

With reference to FIG. 5, two adjacent teeth 70 and 71 can be arranged so that their respective axes $T_1$ and $T_1$ are not parallel but skewed relative to each other. If it is assumed that tooth 71 is to receive a cap, this tooth is cut down, as shown by the dotted line formation 72 to provide the base on which the cap is to be mounted. It can be readily appreciated that the best results are obtained if the cap is made in conformance with the original shape of the tooth as well as orienting the shape of the cap with the axis of the tooth. If the axis $T_2$ of tooth 72 is merely made perpendicular to the plane of the impression, as taught by the prior art, the resulting cap cannot be fitted to the tooth directly but must undergo a great deal of sizing and shaping in order to be of the desired shape. In addition, such sizing and shaping results in producing sections of a cap which are not of uniform thickness, thereby providing a cap of shorter useful duration.

With the holder 11 and the impression 10 thereon clamped in position between plates 12 and 13 by studs 14 and 15 and nuts 16 and 17, this unit is then positioned on base member 63 and secured thereon by the nut 62. One of the block members 25 is then moved along the support member 22 to a position in relation to a tooth impression in which a pin 48 is to be positioned. In order for the block member 25 to be moved along the axis A of the support member 22, it is necessary that the nut 57 on the threaded end 58 of stud 28 be backed off in order to release block member 25 so as to provide sufficient freedom for such movement. Under this condition, the member 25 can also be rotated about the axis A of the support member 22, and when this is done, the parts interconnecting said member with the pin 48 are also moved therewith. In order to properly position and orient the axis P of the pin 48 in relation to the axis of the tooth impression, said pin can be positioned angularly with respect to the axis B of the extension 35 and can also be moved relative to the support member 22 so as to position the pin by moving the pin 48, block 39 and rod 31 relative to the stud 28 which will be, in effect, along the axis C of the rod 31, as well as moving block 39 and pin 48 about axis C. In addition, the rod 31, block 39 and pin 48 can be rotated relative to the axis D of the stud 28. The members described hereinabove therefor provide for movement of the pin 48 about four different axes A, B, C and D in any combination, as well as for movement along the axis C to position the pin in the tooth impression and in accordance with the axis of the tooth. Once the positioning of the pin has been determined, tightening of the nut 53 serves to clamp the end 47 of pin 48 to collet 43 as well as clamping collet 43 and extension 35 to block 39, and tightening of the nut 57 serves to clamp the block 25 to the support member 22, as well as clamping the rod 31 to the stud 28 and the block 25.

After the pin has been properly positioned relative to the axis of the tooth impression and the nuts 53 and 57 tightened, the movable portion 20, together with support member 22 and all the appurtenances thereon, including pin 48, is withdrawn from portion 19. The stone can then be poured into the impression up to a line just above the gum line and the movable portion 20 is returned to portion 19 with pin 48 extending into the poured stone and correctly oriented with respect to the axis of the tooth impression. After the first layer of stone has hardened, nut 53 is released so as to again permit removal of support member 22 and its appurtenances. The first layer is then painted with a separating material, and a plastic sleeve placed over end 47 on pin 48. The second layer of stone is poured and after it has hardened, the first layer is cut to permit removal of the tooth model and pin for "wax-up" of the cap. After the tooth model has been "waxed-up" to provide a replica of the cap to be placed over the prepared tooth, the pin plus the tooth model and "waxed-up" cap can be returned to the originally oriented position on the stone base to check the relationship of the cap to the adjacent teeth.

Since the invention has been described with respect to a particular embodiment thereof, it is not to be limited to the disclosure described hereinabove, but is of a scope as defined by the appended claims.

I claim:
1. A restorative dental device for orienting the axis of a pin in accordance with the axis of a tooth as formed in an impression thereof, the combination comprising:
  means for holding said impression;
  a support post arranged on said holding means;
  a support member fixed to said support post in a position above said holding means and having a shape similar to and larger than that of a jaw contour; and
  means movable along and about said support member for receiving and securing one end of said pin in spaced relation to said support member and permitting displacement of said pin relative to said support member and angular movement of said pin in at least two intersecting and perpendicular planes so as to position said pin within said impression with the axis thereof oriented in accordance with the axis of said impression.

2. A device in accordance with claim 1 wherein said support post comprises two telescoping parts, one being arranged on said holding means and the other carrying said support member so as to locate said support member in a vertical direction relative to said impression.

3. A restorative dental device for orienting the axis of a pin in accordance with the axis of a tooth as formed in an impression thereof, the combination comprising:
  a base member;
  holding means for said impression adapted to be secured to said base member;
  means on said base member for securing said holding means thereto;
  a vertical support post arranged on said holding means;
  a horizontal support member fixed to said support post in a position above said holding means, when positioned on said base member, and having a shape similar to and larger than that of a jaw contour; and
  means movable along and about said support member for receiving and securing one end of said pin to support said pin in spaced relation to said support member and relative to said impression and having spaced vertical and horizontal axes about which said pin can be moved so as to position the free end of said pin within said impression with the axis thereof oriented in accordance with the axis of said impression.

4. A device in accordance with claim 3 wherein said support post comprises a first portion secured to said holding means and a second portion to which said horizontal support member is secured, said second portion being slidably mounted relative to said first portion for positioning said horizontal support member in a vertical direction relative to said impression.

5. A device in accordance with claim 3 wherein said receiving and securing means comprises a first member movable along and about said support member and a second member supported in a cantilever manner by said first member for receiving and securing said pin.

6. A device in accordance with claim 5 wherein said second member is movable toward and away from said first member, rotatable about a first axis along which it is movable, and independently rotatable about a second axis normal to said first axis.

7. A restorative dental device for orienting the axis of a pin in accordance with the axis of a tooth as formed in an impression thereof, the combination comprising:
   a base member;
   holding means for said impression adapted to be secured to said base member;
   means on said base member for securing said holding means thereto;
   a vertical support post arranged on said holding means;
   a horizontal support member fixed to said support post in a position above said holder, when positioned on said base member, and extending from opposite sides of said support post, said support member being formed to a shape similar to and larger than that of a jaw contour;
   means for receiving and securing one end of said pin and adapted to be adjustably supported relative to said support member and said impression; and
   means movable along and about said support member and having two perpendicular axes in a common plane and an axis perpendicular to said common plane and intersecting one of said two axes for supporting said receiving and securing means in an adjustably extendable position relative to said support member along said one of said two axes and for independent movement about said axes so as to position the free end of said pin in said impression with the axis thereof oriented in accordance with the axis of said impression.

8. A restorative dental device for orienting the axis of a pin in accordance with the axis of a tooth as formed in an impression thereof, the combination comprising:
   a base member;
   holding means for said impression adapted to be secured to said base member;
   means on said base member for securing said holding means thereto;
   a vertical support post arranged on said holding means;
   a horizontal support member fixed to said support post in a position above said holder, when positioned on said base member, and extending from opposite sides of said support post, said support member being formed to a shape similar to and larger than that of a jaw contour;
   means for receiving and securing one end of said pin and adapted to be adjustably supported relative to said support member and said impression;
   means movable along and about said support member and having two perpendicular axes in a common plane for supporting said receiving and securing means; and
   a member movable axially along and about one of said perpendicular axes for supporting said receiving and securing means in a cantilever manner relative to said support member and said impression and for movement about an axis perpendicular to said one perpendicular axis, whereby said pin can be positioned relative to said support member and said axes so as to position its axis in accordance with the axis of said impression.

9. A device in accordance with claim 8 wherein said support post comprises two engaging parts, one part being arranged on said holding means and the other part carrying said support member and being insertable into said one part so as to position said support member in a vertical direction relative to said base member and said impression.

10. A device in accordance with claim 8 wherein said receiving and securing means comprises a clamping portion for receiving and securing a collet in which one end of said pin is clamped.

11. A device in accordance with claim 7 wherein said supporting means comprises a first member having an aperture for receiving said support member and movable about and along said support member, a second member mounted on said first member for pivotal movement about an axis spaced from and perpendicular to the axis of said aperture, and a third member receivable by said second member for movement along and about an axis perpendicular to and intersecting the axis of said second member and for pivotally supporting said receiving and securing means in a cantilever manner in relation to said first member for movement about an axis perpendicular to its first-mentioned axis.

12. A device in accordance with claim 11 wherein said second member comprises a stud for receiving said third member and a member in engagement with said third member for simultaneously clamping said first member to said support member and said third member to said stud in independently adjustable positions.

13. A device in accordance with claim 11 wherein said third member comprises an L-shaped arm, the right angle extension thereof engaging and supporting said receiving and securing means so as to permit said pin to be angularly adjusted relative to the plane defined by said arm.

14. A device in accordance with claim 13 wherein said receiving and securing means includes means for simultaneously clamping said pin and said extension thereto.

References Cited by the Examiner

UNITED STATES PATENTS 1,705,223  3/1929  McLean _____ 32—20

RICHARD A. GAUDET, *Primary Examiner.*

R. E. MORGAN, *Examiner.*